United States Patent [19]

Quinn

[11] 4,105,290
[45] Aug. 8, 1978

[54] OPTICAL COLOR COMMUNICATION SYSTEM

[75] Inventor: Bernard W. Quinn, Rancho Palos Verdes, Calif.

[73] Assignee: McDonnell Douglas Corporation, Long Beach, Calif.

[21] Appl. No.: 694,543

[22] Filed: Jun. 10, 1976

[51] Int. Cl.$^2$ .......................... G02B 5/04; G02B 5/18; H04B 9/00
[52] U.S. Cl. ............................. 350/168; 350/162 R; 250/199
[58] Field of Search ............. 350/168, 162 R, 162 SF; 250/199

[56] References Cited

U.S. PATENT DOCUMENTS

| | | | |
|---|---|---|---|
| 3,191,487 | 6/1965 | Kruythoff et al. | 350/168 |
| 3,192,825 | 7/1965 | Courtney-Pratt et al. | 350/168 |
| 3,457,416 | 7/1969 | Elliott | 250/199 |
| 3,758,188 | 9/1973 | Koester | 350/162 R X |

OTHER PUBLICATIONS

J. F. Schomberg, "Spectral Manipulation Device," *IBM Tech. Disclosure Bulletin*, vol. 8, No. 1, Jun., 1965, p. 123.

*Primary Examiner*—John K. Corbin
*Assistant Examiner*—John D. Lee
*Attorney, Agent, or Firm*—W. J. Jason; D. L. Royer

[57] ABSTRACT

A transmitter and remotely located receiver are used to form an optical color communication system wherein diffraction gratings blazed, for example, in the sixth and higher dispersive orders are utilized in the transmitter and receiver to provide for simultaneous transmission and reception of color coded information over hundreds to thousands of communication channels. Another receiver embodiment that can be used with the transmitter additionally includes a prism and image intensifier which are utilized to record the color coded information on black and white film in the form of separated grey toned strips. A black and white to color printer is used to convert and print the grey toned strips in original and unseparated color form.

10 Claims, 10 Drawing Figures

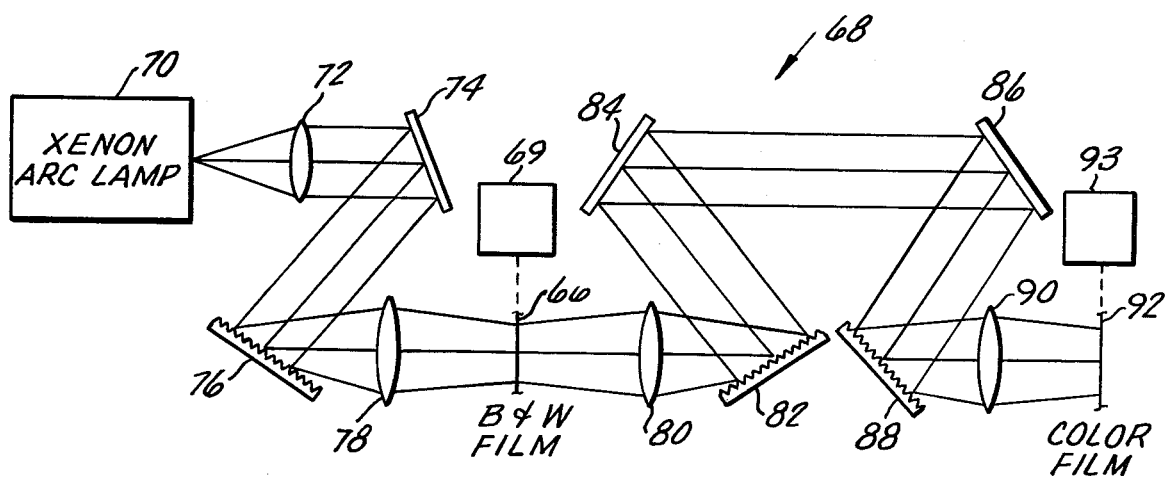
FIG._5
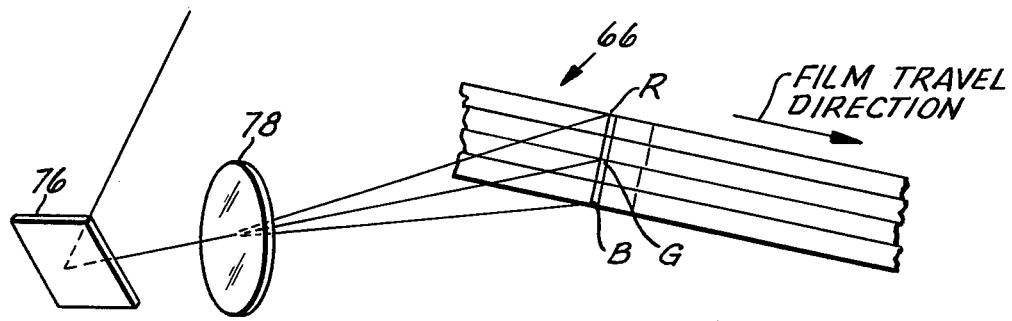
FIG._6
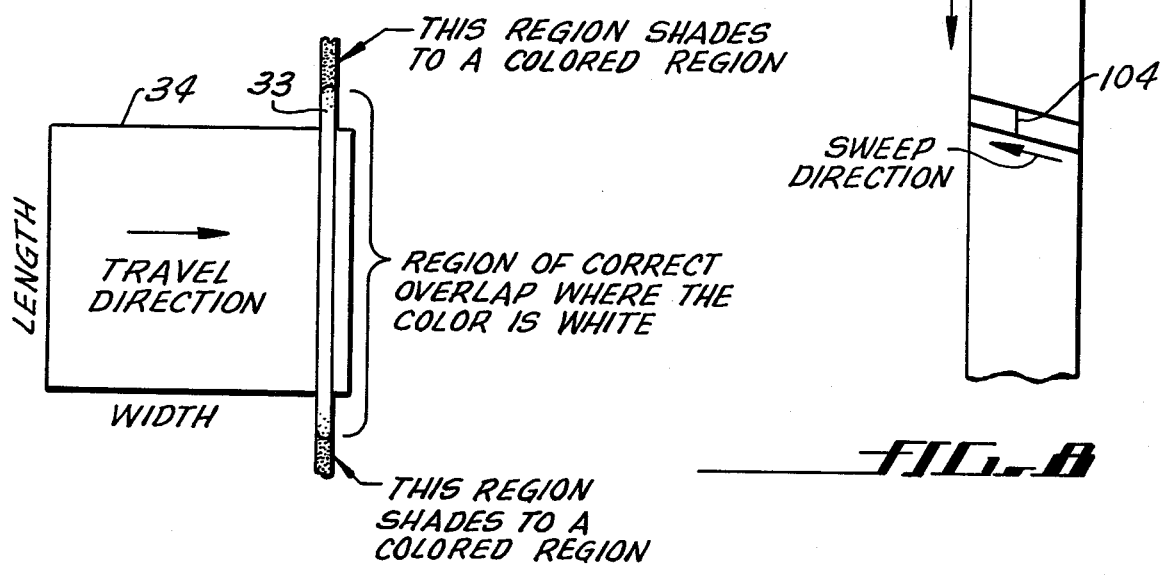
FIG._7
FIG._8

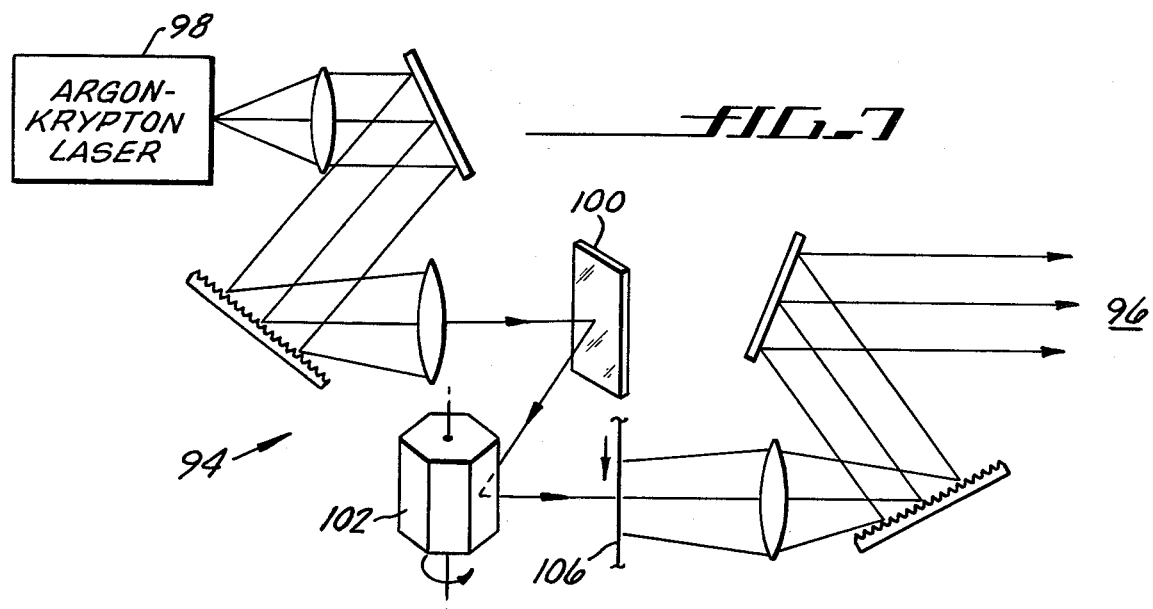
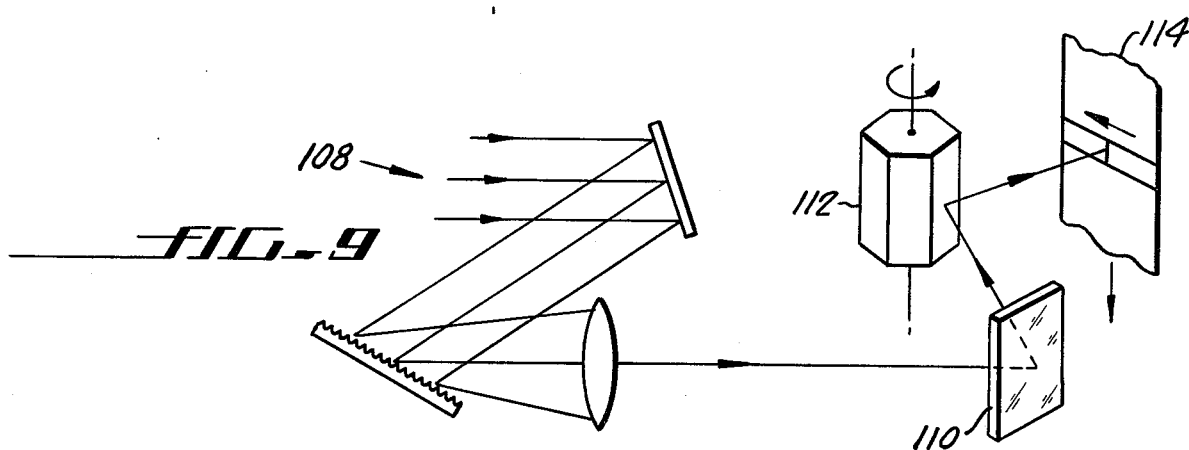
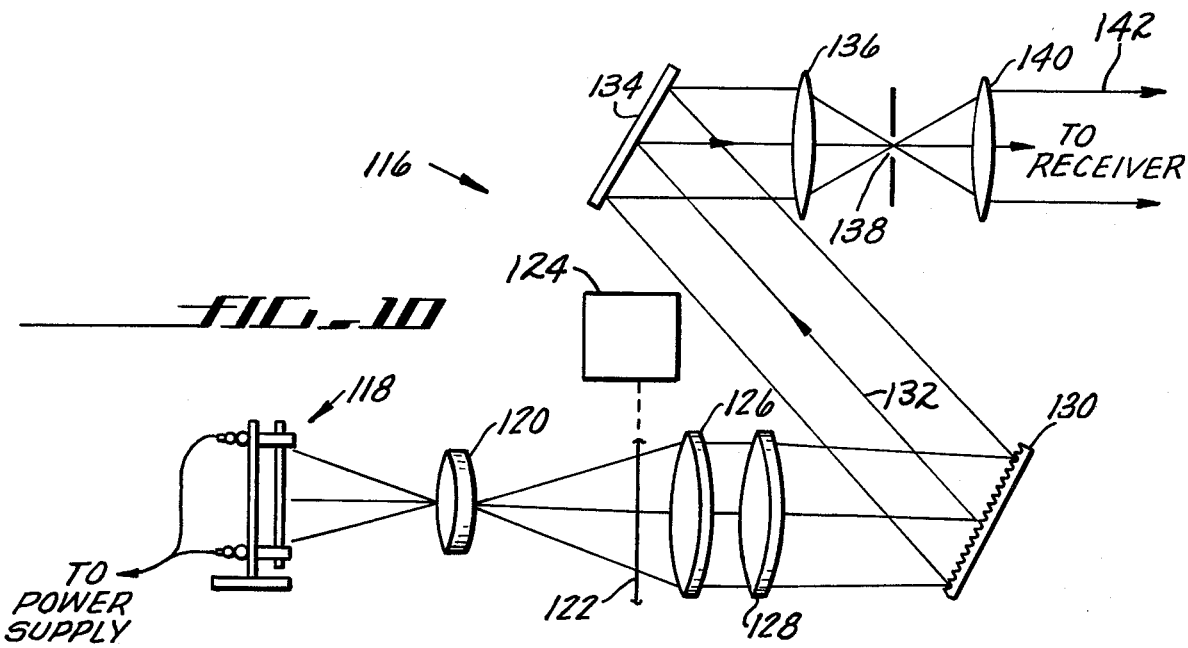

OPTICAL COLOR COMMUNICATION SYSTEM

BACKGROUND OF THE INVENTION

My present invention relates generally to information transmission systems. More particularly, the invention relates to an optical color communication system.

It is well known in the field of communications that the shorter is the wavelength of the carrier signal for data or information transmission, the higher is the potential data transfer rate. This has given emphasis to the consideration of optical communication systems for achieving high data transfer rates. There is also negligible leakage of information in an optical communication system due to the low sidelobe amplitudes of the transmitter of an optical beam. This results in security of transmission. Since there is no interaction or interference between optical (light) frequency transmissions and radio frequency transmissions due to the vast differences in their frequencies and wavelengths, radio frequency pollution (i.e., the overcrowding and resultant interference between radio frequency communication channels) is not increased.

In recent optical communication systems, a laser has been utilized as the carrier. Single channel systems are, however, obtained. The high carrier frequency afforded by the laser, typically about $10^{14}$ hertz, does permit many low data rate channels to be temporally multiplexed into the single channel. A relatively large amount of electrooptical apparatus is, however, required to multiplex the low data rate channels off and on the single high data rate channel. At present, a suitable laser modulator/demodulator which works effectively at a gigahertz ($10^9$ hertz) is still a major development item.

To code a high density data storage medium such as a photograph for transmission of the data, it is ordinarily necessary to scan the photograph with a single spot of light. The output of a detector which receives the modulated scan spot as its light intensity varies during scan is processed electronically and coded for transmission. Where the data to be transmitted is in a single color, the variation of tone (as in a black and white photograph) can be coded as a digital signal having a bit stream variable with tone or as an analogue signal generated according to the variation in a laser characteristic such as amplitude, phase or polarization angle. If the data is in a multicolored form such as a Kodachrome transparency, it is necessary to have three channels for the three primary colors and which would carry respective amounts of the primary colors in each resolved bit of the color record as it is scanned. At the receiver, the transmitted data is suitably decoded and processed into an appropriate form for subsequent handling. This usually involves another scanning operation over a magnetic tape or a radiation sensitive film having the decoded data recorded thereon.

It has been further estimated that an intercity information system, for example, will have to carry more than $10^{10}$ bits per second of data or information in order to justify its installation cost. An optical color communication system is highly desirable over conventional radio or video frequency communication systems because the optical system is very much simpler, less costly, more reliable, requires less maintenance and provides a data transfer rate far beyond the capability of the radio or video frequency communication systems.

SUMMARY OF THE INVENTION

Briefly, and in general terms, my invention is preferably accomplished by providing an optical color communication system including a transmitter and a remotely located receiver, wherein color coded information is transmitted and received in the system. In one illustrative embodiment of the invention, the transmitter comprises a light source having a continuous spectral output, a first lens for collimating the white light from the light source, a first diffraction grating having the collimated white light directed thereon and providing the sixth and higher diffraction orders which are collected by a second lens, a developed film containing color information therein placed in the focal plane of the second lens to modulate the spectra provided by the higher diffraction orders of the first grating, a third lens for collecting and collimating the modulated light from the illuminated film, and a second diffraction grating for forming the sixth and higher diffraction orders of the colors from the third lens to provide an emergent collimated beam wherein all wavelengths of light are traveling in the same direction. The developed film can be scanned by suitable translation thereof.

A first illustrative embodiment of a receiver which can be used with the transmitter broadly described above comprises a third (numerically in the system) diffraction grating which receives the collimated beam from the transmitter and forms the sixth and successively higher diffraction orders from the incident beam, a fourth (systemwise) lens for collecting the sixth and higher diffraction orders and forming at its focal plane an image of the light source for every resolved color, and unexposed color film placed in the focal plane of the fourth lens to record the color information on the developed film in the transmitter. The unexposed film is translated in synchronism with the translation of the developed film in the transmitter.

When the transmitted light at the receiver is low enough, a second illustrative embodiment of the receiver including an image intensifier can be used. In this instance, the entrance of the image intensifier is placed at the focal plane of the fourth lens and the third diffraction grating is crossed with a prism which will separate the spectral lines that would have fallen on each other. The separated spectral lines provide a light output at the exit of the image intensifier and which retains the spatial relationships existing at the intensifier entrance. These spectral lines are suitably recorded on unexposed black and white film which will show, when developed, corresponding strips of grey toned imagery.

A black and white to color printer is used to print the grey toned strips in color. An illustrative embodiment of the printer comprises a white light source, a first lens for collimating the white light and directing it into a first diffraction grating which is blazed in the first diffraction order, a second lens for collecting the first diffraction order light and forming in its focal plane a line ranging in color from red to blue that is passed through and modulated by the grey toned strips at such point, a third lens for collecting and collimating the modulated light into a second diffraction grating identical to the first grating, a third diffraction grating blazed in the sixth and higher diffraction orders for receiving the light from the second grating and producing the sixth order of the red and successively higher orders of the succeeding colors, and a fourth lens for forming in its focal plane from the sixth and higher diffraction order light of the third grating a white light fan which can be viewed by eye or recorded on color film.

Another embodiment of the optical color communication system utilizes a laser light source instead of a Xenon arc having a continuous spectral output. Similarly, for the first system embodiment, another transmitter can be used and which employs a long arc lamp to furnish a continuous spectrum from each position along the arc.

BRIEF DESCRIPTION OF THE DRAWINGS

My invention will be more fully understood, and other advantages and features thereof will become apparent, from the following description of certain exemplary embodiments of the invention. The description is to be taken in conjunction with the accompanying drawings, in which:

FIG. 2 is a frontal elevational view of a color transparency with a portion positioned to modulate a white light fan formed by a grating and lens combination in the transmitter of FIG. 1.

FIG. 5 is an elevational view, shown partly in diagrammatic and schematic form, of an illustrative embodiment of a black and white to color printer which can be used to print the images recorded on black and white film by the receiver of FIG. 4 in color on color film;

FIG. 6 is a fragmentary perspective view showing first diffraction order light focused on the grey toned strips on the developed black and white film in the printer on FIG. 5;

FIG. 7 is an elevational view, shown partly in diagrammatic and perspective form, of an illustrative embodiment of the transmitter of an optical color communication system utilizing a laser light source;

FIG. 8 is a fragmentary, frontal, elevational view illustrating the lateral sweep path of a scan line across the width of film having a constant vertical travel;

FIG. 9 is an elevational view, shown partly in diagrammatic and perspective form, of an illustrative embodiment of a receiver which can be used with the transmitter of FIG. 7; and FIG. 10 is an elevational view, shown partially in diagrammatic and schematic form, of another embodiment of a transmitter which can be used in place of the transmitter shown in FIG. 1.

DESCRIPTION OF THE PRESENT EMBODIMENTS

In the following description and accompanying drawings of the exemplary embodiments of my invention, some specific values and types of components are disclosed. It is to be understood, of course, that such values and types of components are given as examples only and are not intended to limit the scope of this invention in any manner.

Figure 1:
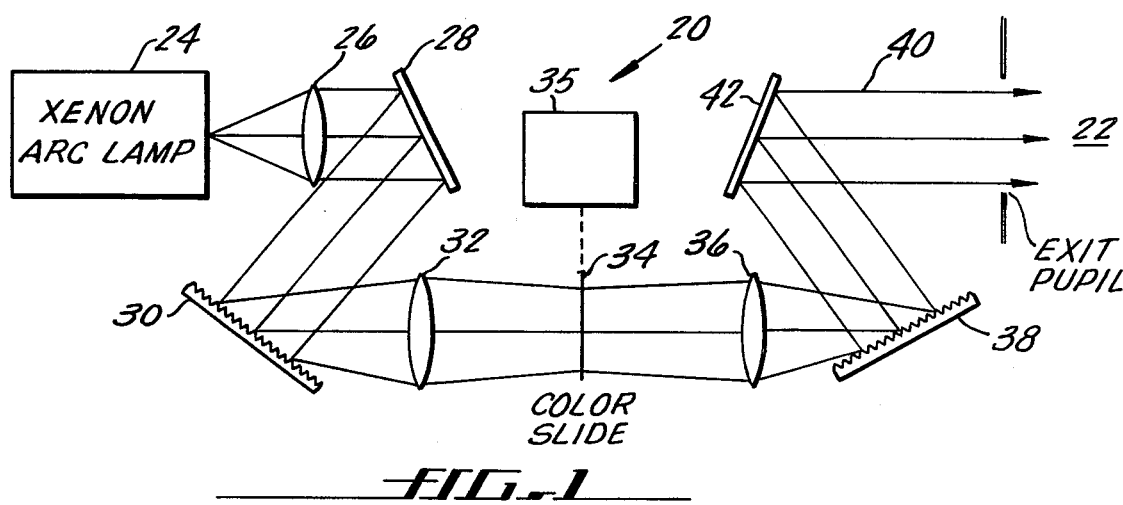
FIG. 1 is an elevational view, shown partly in diagrammatic and schematic form, of an illustrative embodiment of the transmitter of an optical color communication system constructed according to this invention.

FIG. 1 is an elevational view, shown partly in diagrammatic and schematic form, of an illustrative embodiment of the transmitter 20 of an optical color communication system 22 constructed according to this invention. This view of the transmitter 20 can, of course, equally well represent a plan view. In the transmitter 20, the output light from a source 24 is collimated by lens 26 and directed to a mirror 28. The light source 24 provides a continuous spectral output and can be, for example, a Xenon arc lamp. The mirror 28 reflects the collimated white light onto a diffraction grating 30 which is blazed for the sixth and successively higher dispersive orders. The diffracted collimated light from the grating 30 is collected by lens 32. This lens 32 forms in its focal plane an image of the arc light source 24 for every resolved color.

Due to the dispersive characteristics or properties of the grating 30, the centers of the light source images formed by the lens 32 in its focal plane are separated although the images overlap. The strip of overlapping line images thus formed range in color from one end to the other. By working in the sixth and higher diffraction or dispersive orders of the grating 30, the spectrum consists of four or more lines which are superimposed. Each successively superimposed line corresponds to a successive order of dispersion of the grating 30. In this manner, the visible spectrum between, for example, 400 and 700 nanometers of wavelength is covered with one line extending from 400 nm to 470 nm, a second line from 470 nm to 530 nm, a third line from 530 nm to 600 nm and a fourth line from 600 nm to 700 nm. At any one spatial position along these four superimposed lines, there are four different colors present.

To the eye, the strip of four superimposed lines will look white instead of the rainbow spectrum one usually sees. When a colored photograph (developed film transparency) is put into this white light fan, the spectral transmission properties of the developed film will selectively attenuate each of the four colors present at any one spatial position along the strip. If a red spot were present, for example, no blue would be transmitted by the developed film, only red and a little green.

The 6th through 9th dispersive orders were used for the grating 30 because of the desired overlap between those orders. The overlap provided at least one representative primary color at each spatial position along the desired length of the scanning fan. Lower orders would not have provided one of each of the primary colors. Higher orders would have provided more than one sample of a primary color which was unnecessary. For example, using a 300 grooves per mm echelle, the 9th through 14th orders would be necessary to cover blue at 411.0 namometer through red at 690.0 nanometer. This would provide six colors at each spatial position.

When a white light collimated beam containing, for example, only the visible colors which lie between 400 nanometer (blue) wavelength through 700 nanometer (red) wavelength is incident on a plane grating, the diffracted light will form a number of rainbow type of lines. Each line will change color through its length in a continuous manner from a blue to a red. Looking at the diffraction orders on one side of the zero order (the zero order occurs at the position where light would go if the grating were an ordinary mirror and the light would appear white), it will be seen that the lines are arrayed colinear but with a steadily diminishing distance between the red of one end of order $n$ and the blue of one end of the order $n + 1$. That is, the first and second diffraction orders are well separated but by the time the 3rd and 4th diffraction orders are reached, the two lines begin to visibly overlap. At that set of spatial positions, two colors are present at any one position in the overlap.

Continuing to the 6th and certain other higher orders (6th, 7th, 8th, 9th), the overlap is sufficient to have a red, a green, and two blue colors at each spatial position. At this overlap region, the line will appear white. The two blue colors are a consequence of the dispersive properties of the grating and only one is really needed. If the regions of color in the visible spectrum and the angular dispersive effects of a plane diffraction grating are examined, there is not an equally long red region, green region and blue region. The blue dispersion region is almost equally as long as the sum of the red and green regions.

FIG. 2 is a frontal elevational view of the film or slide 34 and the white light fan formed by the grating 30 and lens 32 combination. The light from a well collimated beam when dispersed by a grating will resemble a rectangle 33 with a rounded blue end nearest the grating and a rounded red end farthest from the grating. Each order will have its own rectangle. When a good lens is placed in the light from the grating, each other will resemble a narrow line with a blue end nearest the grating and a red end farthest away. The width of the line is the width of the image of the light source 24. The term "fan" is perhaps more descriptive than is needed since the line formed by the lens 32 will have a blue image slightly narrower than the red image due to the imaging properties of the lens. The lines of overlapping orders are always colinear and never displaced sideways.

A developed film (transparency) 34 is placed in the focal plane of the lens 32 and is illuminated by the strip of overlapping line images of the light source 24. The film or slide 34 is scanned by translating it perpendicularly to the plane of the paper in FIG. 1 by translating means 35. Each successive stripline element in the film format will, of course, successively modulate the light in the white stripline image formed by the lens 32. A lens 36 following the illuminated film 34 collects and collimates the modulated light and passes it on to a second diffraction grating 38 which is identical to the first grating 30. The gratings 30 and 38 can be, for example, Bausch and Lomb gratings with 300 grooves per millimeter blazed at 36° 52' and having a ruled area of 64 × 64 mm.

This grating 38, with its particular dispersive characteristics, forms the sixth and higher orders of the colors falling on it. All of the light emerging (reflectively diffracted) from the second grating 38 is still collimated but all wavelengths are now traveling in the same direction. Thus, the transformation of angular direction for each wavelength of light following the film 34 is the inverse of that which occurred prior to the film. The emergent collimated beam 40 from the grating 38 is white in appearance and can be directed by mirror 42 in a desired direction from the transmitter 20. It is noted that the relative orientation between the length of the Xenon arc 24 and the length of the grooves in the grating 30 need not be maintained. The relative orientation between the grooves of gratings 30 and 38 is important — they must be parallel.

This color transmission technique can, of course, be used with any short or long-term storage medium which utilizes changes in spectral transmission as a coding device. By this spectral scanning technique, thousands of storage addresses can be transferred simultaneously. Any scanning and transmission process which permits the transfer of frequency coded information can utilize the very sharp filtering property of this technique in any wavelength of the electromagnetic or acoustic spectrum. It is also unnecessary to utilize a thermal light source to obtain a spectral continuum for this technique. A "white light" argon-krypton laser producing wavelengths simultaneously of 488 nm, 514.5 nm, 568.2 nm and 647.1 nm with 1.0 nm of spectral "impurity" about each line can be utilized. However, the scanning method for the developed color film 34 would require the use of a rotating or spinning scanner. This is described and illustrated in greater details below later.

This technique permits the simultaneous transmission over hundreds to thousands of communication channels of color coded information while requiring and utilizing only simple optical components. These channels are not distinct one from another in the sense of normal communication theory. The channels share information in that a number (say, ten) of spectrally resolved channels can carry portions of one spatially resolved data bit due to the spectral resolution of a diffraction grating working cooperatively with the spatial resolution of a lens.

The number ten is a relative number to be compared to the thousands of channels available in the usual continuous, visual, thermal spectrum of 300 nanometers bandwidth. Using the normally available 300 grooves per millimeter grating, the spectral resolution is about 0.05 nanometer. For a 1.0 nanometer usable bandwidth from a YAG laser, for example, such a grating would permit the use of twenty channels. Due to alignment errors, there should be allowed about ten guard channels interspersed alternately to the communication channels to prevent crosstalk. These guard channels would be blocked out, thus permitting about ten usable communication channels. When directed through a light pipe, there is no concern for mixing of channels since each channel has a spectral code and can be decoded at a terminal.

Figure 3:
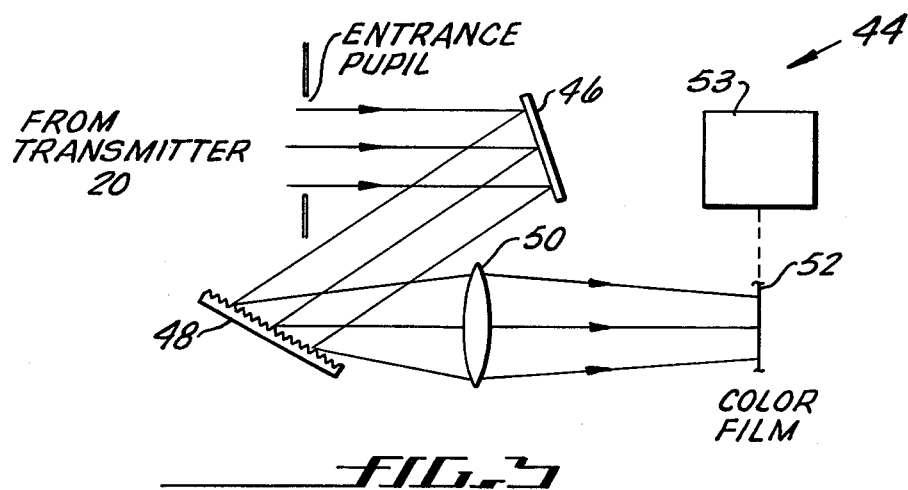
FIG. 3 is an elevational view, shown also in partially diagrammatic and schematic form, of an illustrative embodiment of the receiver used with the transmitter of FIG. 1 to form the color communication system.

FIG. 3 is an elevational (or plan) view, shown also in partially diagrammatic and schematic form, of an illustrative embodiment of a receiver 44 which can be used with the transmitter 20 of FIG. 1. The color communication system 22 thus broadly comprises the transmitter 20 and receiver 44. In the receiver 44, a mirror 46 receives the collimated beam 40 from the transmitter 20 and reflects the beam to diffraction grating 48. This grating 48 is identical to the gratings 30 and 38 (FIG. 1) in the transmitter 20 and forms the sixth and successively higher dispersive orders of diffracted light from the incident beam 40.

The white light beam 40 between the transmitter 20 and receiver 44 consists of a set of beams of equal diameter and equal angular spread. There is a beam for each color. If this white beam 40 is incident on a lens in the receiver 44 without using a grating, a white spot would be formed. Each color with its modulation code would be in that spot. If now a grating first receives the white light beam 40 and then the lens, the white spot is no longer seen but is replaced by a line which is white throughout a finite region. It will shade to a colored region at each end. However, all the colors are arranged sequentially just as they were in the transmitter 20. The transmitter's scanning line or white light fan has been reconstructed with the colors properly placed.

The diffracted light from grating 48 is collected by lens 50 and an image of the light source 24 as modulated by the film 34 (FIG. 1) is formed at the focal plane of the lens for every resolved color. A strip which looks white is again formed just like the strip at the focal plane of the lens 32 (FIG. 1) in the transmitter 20. The light source 24 image can display an image of the color film 34 if the scanning line were wide enough and the transmitter 20 and receiver 44 were close enough. When these conditions are not met, the receiver 44 will form a spot of light which is no longer an image of the source 24 but only some smaller part of the source. This smaller part of the source 24 may not be wide enough to show any detail in the color film 34 which it illuminated. However, this scanning spot (one color) will be modulated in intensity as the transmitter film 34 is transported through it.

Unexposed color film 52 placed at the focal plane of the lens 50 and translated by translating means 53 in synchronism with the transmitter film 34 records, stripline for stripline, the color information obtained through the transmitter film and entering the transmitter emergent beam 40. Color images on 35 millimeter Kodachrome slides have been transmitted faithfully by the system 22 over a distance of, for example, 180 feet in the laboratory and recorded on Polacolor film. The translating means 35 in the transmitter 20 and the translating means 53 in the receiver 44 can be conventional and similar drive devices which can be electrically energized simultaneously in this instance by a common control means.

The means blocks 35 and 53 in FIGS. 1 and 2 can also represent a transmitter (source) and receiver of a control beam parallel to beam 40 for starting, stopping and synchronizing operation of the translating means 35 and 53. It is, of course, well known that there are many ways of putting a starting and stopping code on the control light incident on the receiver as well as a synchronization code. Precise synchronism of film transport speeds between the transmitter 20 and receiver 44 is not needed. A velocity match of 1% to 5% merely means a scale change of that amount in the transport direction. What is needed is linearity of transport velocity, otherwise "banding" appears and resolution can be lost.

It may be noted that a beam expander (not shown) placed in the transmitter 20 exit pupil and a beam compressor (also not shown) placed in the receiver 44 entrance pupil can be used to capture more of the beam 40 when distances between transmitter and receiver exceed approximately a hundred feet up to a few hundred miles. In FIG. 1, the transmitter exit pupil is established by the mirror 42 if smaller than the beam formed by lens 36. The grating 38 and the exit directing mirror 42 are normally sized so that the exit pupil is established by the lens 36. In FIG. 3, the receiver's entrance pupil is almost always established by the size of the mirror 46 since at a distance the beam of light incident on the receiver 44 is almost always larger than mirror 46 due to spreading.

A beam compressor at the transmitter exit would produce a smaller beam diameter at that point. It also has the very undesirable property of magnifying any angular divergence of the beam. Thus, for a given transmitter to receiver separation, the beam diameter would grow faster than without a beam compressor resulting in the receiver collecting much less power. If there is not a limitation on received power to record, this technique can be used to alleviate angular pointing requirements.

The color communication system 22 would have application in any installation where large amounts of data are stored and are required to be transmitted to another installation within a short transmission period. In both of the Skylab and Spacestation projects, for example, large amounts of earth resources data may be accumulated. By adapting the transmitter 20 for use in Skylab or Spacestation and waiting until over the United States or a specifically selected country, the dump of accumulated data can be made to an airborne receiver 44 with the system 22 such that a high data rate relay satellite can be obviated.

Due to the tightness of the transmission beam, encrypting of data (which would severely restrict usable bandwidth) is not necessary. Also, data can be securely transmitted from one room to another with a small diameter light pipe or fiber optic link. The output beam of the transmitter 20 can be focused by a lens onto the input end of a light pipe or fiber optic bundle. The usual pipe or bundle can carry the collimated light beam for distances up to a few hundred feet before the attenuation loss becomes too great. The receiver 44 would utilize a lens to focus on the output end of the light pipe or fiber optic bundle and collimate the light being emitted therefrom for the receiver grating 48. The light pipe or fiber optic bundle can, of course, be routed in a manner similar to that of an electrical cable.

One fiber can carry all of the channels without unrecoverable geometrical distortion of the data between channels. Since the refractive index for an optical material does vary with the wavelength of the light used, blue will travel faster than red through an optic fiber, for example. If blue travels 20 cm in $10^{-12}$ seconds, red would travel about 15 cm in $10^{-12}$ seconds in a glass fiber. Over a length of one kilometer ($10^5$ cm) a red and a blue bits of information which entered the fiber at the same time would arrive at the one kilometer end separated by $5 \times 10^{-10}$ seconds — a negligible amount. The fiber bundle, if an incoherent bundle, merely carries more light per bit so each fiber carries redundant bits. The fiber bundle, if coherent, will preserve the spatial relationship of bits in the area of the media being imaged. In this case, the fibers do not carry redundant information. Each fiber "sees" its own unique spatial area in the media to be transmitted.

Figure 4:
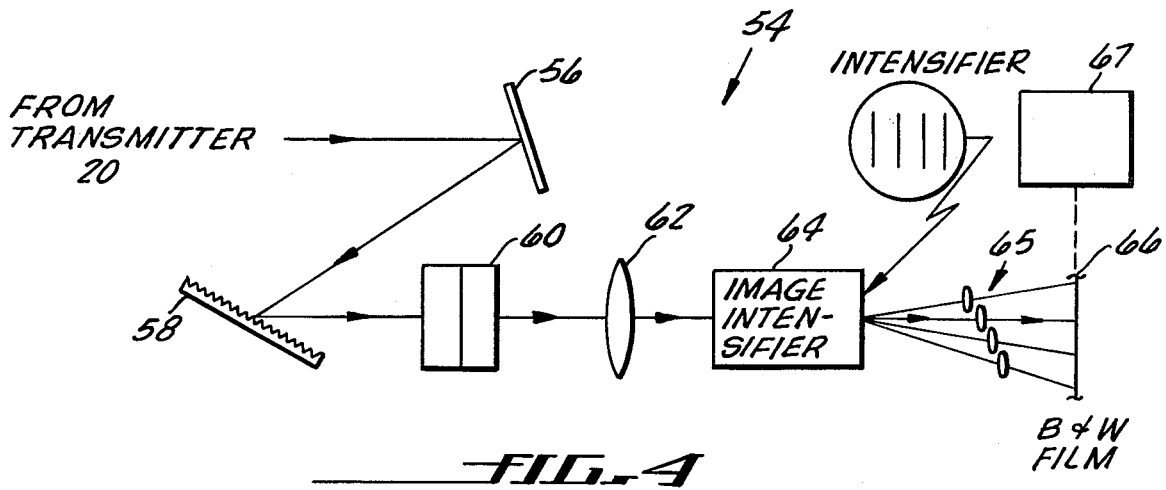
FIG. 4 is an elevational view, generally similar to that of FIG. 3, of an illustrative embodiment of another receiver further incorporating a prism and image intensifier to provide spatially separated spectral images which can be recorded on black and white film.

FIG. 4 is an elevational view, generally similar to that of FIG. 3 of an illustrative embodiment of another receiver 54 which can be used with the transmitter 20 of FIG. 1. The receiver 54 includes a mirror 56 and diffraction grating 58 which can be respectively identical to the mirror 46 and grating 48 in the receiver 44 of FIG. 3. The grating 58 is crossed with a prism 60 which will separate the spectral lines that would have fallen on each other. The apex line of the prism 60 is oriented perpendicularly to the groove orientation in the grating 58 so that the spectrally dispersive power of the prism separates the spectral lines.

These separated lines are focused by lens 62 on an image intensifier 64 placed at the focal plane of this lens in the receiver 54. The lens 62 can be identical to the lens 50 in the receiver 44. The image itensifier 64 can be used when the background light at the transmitter 20 is low enough to require this amplification. There are many available models of image intensifiers which are suitable depending on what data rate is desired, what intensification is required and what resolution is needed in the final recording. A representative and satisfactory type for the receiver 54 is the Bendix Model BX-749, for example.

The image intensifier 64 provides an intensified light output of, for example, four separated spectral lines at the intensifier's exit and which lines still retain their spatial relationships that existed at the intensifier's entrance. By either fiber optics or lens 65, these four intensified spectral lines can be recorded on one piece of unexposed black and white film 66. The exposed film 66 will show four strips of grey toned imagery when developed. The image intensifier receiver 54 thus codes each resolved bit by an analogue code (tone) and the spatial position in each of the four strips. Each strip then represents the color to be added to the bit and the strip's tone represents the amount of the added color. These strips can be printed in color by a novel means which is described below. Of course, correlated translation of the films 34 (FIG. 1) and 66 (several times faster and vertically in FIG. 4 by translating means 67) will provide successive sets of grey toned strip images on the latter film.

FIG. 5 is an elevational (or plan) view, shown partly in diagrammatic and schematic form, of an illustrative embodiment of a black and white to color printer 68 which can be used to convert and print the grey toned strip images on the developed film 66 (FIG. 4) in color. In the printer 68, white output light from a source 70 is collimated by a lens 72 and the collimated light is reflected by mirror 74 onto a diffraction grating 76. The source 70 can be a Xenon arc lamp, for example. The grating 76 is blazed in the first order instead of in the sixth and higher dispersive orders as before.

The grating 76 can have 300 grooves per millimeter but the number of grooves per millimeter is immaterial — within reasonable limits. It is the combination of the grating 76 dispersive power and lens 78 focal length that determines the length of the scanning spectrum. This length, however, must match the width of the developed film 66 in FIG. 5 (length of the recording film 66 in FIG. 4 is vertically and length of the developed film 66 in FIG. 5 is perpendicularly to the plane of the paper) so that each color assumes its proper spatial position. Lens 78 collects the first diffraction order light and forms in its focal plane a line ranging in color from red at one end to blue at the other.

FIG. 6 is a fragmentary perspective view showing the first diffraction order light focused by lens 78 on the four grey toned strips on the black and white developed film 66. The developed black and white film 66 with its grey toned strip images is placed in the focal plane of the lens 78 so that the first order light beam is passed through the film and modulated by the strip images. In FIG. 5 the spectral array of the light fan in the first order beam by suitable sizing preferably fits the distance from the top of one strip image to the bottom of the fourth. A lens 80 collects the modulated light and collimates it onto a second diffraction grating 82 which is identical to the first grating 76. The second grating 82 produces first diffraction order light which emerges from the second grating in the same direction.

The light from the second grating 82 is reflected by mirrors 84 and 86 onto a third diffraction grating 88 which is blazed so that the sixth order of the red and successively higher orders of the succeeding colors are formed. A lens 90 following the third grating 88 now recreates the white light fan as it would have appeared on the image intensifier 64 (FIG. 4) had the prism 60 not followed the receiver grating 58. This final light fan can be viewed by eye or recorded on unexposed color film 92 placed at the focal plane of the lens 90. Of course, the developed black and white film 66 and the color film 92 are translated by translating means 69 and 93 in correlated synchronism perpendicularly to the plane of the paper in FIG. 5 to produce a complete picture, for example.

FIG. 7 is an elevational view, shown partly in diagrammatic and perspective form, of an illustrative embodiment of the transmitter 94 of an optical color communication system 96 utilizing an argon-krypton laser 98 as the light source. The transmitter 94 is similar to the transmitter 20 of FIG. 1 except that mirror 100 and scanner 102 are additionally used. These elements 100 and 102 are required because it is practically impossible to achieve enough angular dispersion width (even with an echelle) with a lens focal length long enough to get a scan line whose length is about ¼ inch or ½ inch with a laser line whose spectral "impurity" is 1.0 nanometer. The format width to be scanned is almost always wider than ¼ inch (even 8 mm film is wider). Thus, the scan line must be moved across the film width in a suitable orientation.

FIG. 8 is a fragmentary, frontal, elevational view showing scan line 104 ("white light" fan) oriented 90° to the usual scanning orientation and moved laterally across the width of film 106 having a vertical travel direction. The standard rotating or spinning scanner 102 moves the scan line 104 laterally across the film width but a continuous vertical travel of the film 106 would cause a slight slope in the lateral sweep as indicated. A geneva movement or stepper motor film drive can, of course, be used to provide an intermittent movement of the film 106 to eliminate any slope in the lateral sweep.

FIG. 9 is an elevational view, shown partly in diagrammatic and perspective form, of an illustrative embodiment of a receiver 108 which can be used with the transmitter 94 of FIG. 7. The receiver 108 is similar to the receiver 44 of FIG. 3 except that mirror 110 and scanner 112 are additionally used. The scanner 112 can be identical to the scanner 102 of FIG. 7 and is driven synchronously therewith. The film 114 being exposed is, of course, also driven in the same manner and synchronously with the film 106 of FIGS. 7 and 8.

FIG. 10 is an elevational view, shown partially in diagrammatic and schematic form, of another embodiment of a transmitter 20 for the optical color communication system 22 of FIG. 1. A long arc lamp 118, or ribbon filament lamp, furnishes a continuous spectrum from each position along the arc. Lens 120 following the arc lamp 118 images the arc onto the color media 122 to be transmitted. The color media 122 modulates the spectrum and is translated by translating means 124 as in previous embodiments. In this example, all the spectrum is present at all the points along the illuminated length of the arc image. Field lens 126 collects all the light transmitted by the color media 122 and collimating lens 128 collimates the light onto the same form of higher order grating 130 as in previous embodiments.

The diffracted light from the grating 130 (properly oriented and blazed) emerges in one direction for the 6th, 7th, 8th and 9th orders. The transmitted beam 132 appears as a very long spectrum of light with a centrally located white beam. To prevent the receiver 44 (FIG. 3) from seeing light from the undesired parts of the spectrum and from different regions along the color media 122, the grating 130 is followed by mirror 134 and another lens 136 and, in turn, by a pinhole 138 placed one focal length from the lens. The pinhole 138 is followed by a duplicate 140 of the previous lens 136 which recollimates the light and directs output beam 142 toward the receiver 44. The lenses 136 and 140 and pinhole 138 form a telecentric stop which is a spatial filter. The receiver 44 will see each position along the image of the long arc in four colors but the wavelengths of these colors shift slightly for a slight shift in position along the arc image. This prevents two or more positions along the arc image from being imaged and positioned by the receiver 44 at one confused position.

While certain exemplary embodiments of this invention have been described above and shown in the accompanying drawings, it is to be understood that such embodiments are merely illustrative of, and not restrictive on, the broad invention and that I do not desire to be limited in my invention to the specific arrangements, constructions or structures described and shown, for various modifications may be made therein without departure from the principles involved in this invention.

I claim:

1. An optical color communication system comprising:
   a transmitter including
      a light source having a predetermined spectral output and adapted to provide collimated light therefrom,
      a first diffraction means having said collimated light from said light source directed thereon and providing predetermined higher diffraction orders of said collimated light from said light source,
      a first lens means for collecting said predetermined higher diffraction orders of said collimated light diffracted by said first diffraction means,
      means adapted to be positioned in the focal plane of said first lens means and containing color information for modulating said diffracted light collected by said first lens means,
      a second lens means for collecting and collimating the light modulated by said modulating means, and
      a second diffraction means having said collimated light from said second lens means directed thereon and providing predetermined higher diffraction orders of said collimated light from said second lens means and which comprise an emergent collimated light beam from said transmitter; and
   a receiver positioned to receive said emergent collimated light beam from said transmitter, said receiver including
      a third diffraction means adapted to receive said emergent collimated light beam from said transmitter and provide predetermined higher diffraction orders of the collimated light of said beam,
      a third lens means for collecting said predetermined higher diffraction orders of said collimated light diffracted by said third diffraction means, and
      color sensitive means adapted to be positioned in the focal plane of said third lens means for detecting said color information of said modulating means.

2. The invention as defined in claim 1 wherein said modulating means comprises a developed film containing color information therein, and said color sensitive means comprises unexposed color film.

3. The invention as defined in claim 1 further comprising means for scanning said color information in said modulating means in a predetermined pattern, and means for adjusting said color sensitive means in a predetermined pattern correspondingly related to said predetermined pattern of said scanning means.

4. The invention as defined in claim 3 wherein said modulating means comprises a developed film containing color information therein, and said color sensitive means comprises unexposed color film, said developed film being translated in a predetermined direction to scan said color information therein and said unexposed color film correspondingly translated in a predetermined direction in synchronism with said developed film.

5. An optical communication system comprising:
   a transmitter including
      a light source having a predetermined spectral output and adapted to provide collimated light therefrom,
      a first diffraction means having said collimated light from said light source directed thereon and providing predetermined higher diffraction orders of said collimated light from said light source,
      a first lens means for collecting said predetermined higher diffraction orders of said collimated light diffracted by said first diffraction means,
      means adapted to be positioned in the focal plane of said first lens means and containing color information for modulating said diffracted light collected by said first lens means,
      a second lens means for collecting and collimating the light modulated by said modulating means, and
      a second diffraction means having said collimated light from said second lens means directed thereon and providing predetermined higher diffraction orders of said collimated light from said second lens means and which comprise an emergent collimated light beam from said transmitter; and
   a receiver positioned to receive said emergent collimated light beam from said transmitter, said receiver including
      a third diffraction means adapted to receive said emergent collimated light beam from said transmitter and provide predetermined higher diffraction orders of the collimated light of said beam,
      a dispersion means for separating the normally overlapping spectral lines of said predetermined higher diffraction orders of said collimated light diffracted by said third diffraction means,
      an image intensifier for providing intensified images of said separated spectral lines, and
      means for recording said intensified images on light sensitive film.

6. The invention as defined in claim 5 wherein said modulating means comprises a developed film containing color information therein.

7. For use in an optical color communication system including a transmitter providing an emergent collimated light beam carrying color information therein, a receiver comprising:

diffraction means adapted to receive said emergent collimated light beam from said transmitter and provide predetermined higher diffraction orders of the collimated light of said beam;

dispersion means for separating the normally overlapping spectral lines of said predetermined higher diffraction orders of said collimated light diffracted by said diffraction means; and an image intensifier for providing intensified images of said separated spectral lines.

8. The invention as defined in claim 7 further comprising means for recording said intensified images on light sensitive film.

9. A monochromatic to color converter comprising:

a light source having a predetermined spectral output and adapted to provide collimated light therefrom;

a first diffraction means having said collimated light from said light source directed thereon and providing the first diffraction order of said collimated light from said light source;

a first lens means for collecting said first diffraction order of said collimated light diffracted by said first diffraction means;

means adapted to be positioned in the focal plane of said first lens means and containing monochromatic separated spectral lines for modulating said diffracted light collected by said first lens means, said monochromatic separated spectral lines being produced from normally overlapping spectral lines of predetermined higher diffraction orders of diffracted light modulated by means containing color information therein;

a second lens means for collecting and collimating the light modulated by said monochromatic separated spectral lines;

a second diffraction means having said collimated light from said second lens means directed thereon and providing the first diffraction order of said collimated light from said second lens means;

a third diffraction means adapted to receive said collimated light diffracted by said second diffraction means and providing predetermined higher diffraction orders of said diffracted light from said second diffraction means;

a third lens means for collecting said predetermined higher diffraction orders of said diffracted light from said third diffraction means; and color sensitive means adapted to be positioned in the focal plane of said third lens means for detecting said color information from which said monochromatic separated spectral lines were obtained.

10. The invention as defined in claim 9 wherein said monochromatic separated spectral lines include grey toned strips for modulating said diffracted light collected by said first lens means.

* * * * *